(12) United States Patent
Kandan et al.

(10) Patent No.: US 12,250,273 B2
(45) Date of Patent: *Mar. 11, 2025

(54) APPARATUS FOR SHARING NETWORK DEVICE CONNECTION DATA

(71) Applicant: Stel Life, Inc., Philadelphia, PA (US)

(72) Inventors: Siddarth Kandan, Philadelphia, PA (US); Jonathan Pry, Philadelphia, PA (US); Carlos Roque, Philadelphia, PA (US)

(73) Assignee: Stel Life, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,252

(22) Filed: May 23, 2024

(65) Prior Publication Data

US 2024/0364785 A1 Oct. 31, 2024

Related U.S. Application Data

(63) Continuation of application No. 18/304,991, filed on Apr. 21, 2023, now Pat. No. 12,081,622, which is a
(Continued)

(51) Int. Cl.
*H04L 67/12* (2022.01)
*G06F 9/445* (2018.01)
(Continued)

(52) U.S. Cl.
CPC ............. *H04L 67/12* (2013.01); *G06F 9/445* (2013.01); *H04L 12/2834* (2013.01);
(Continued)

(58) Field of Classification Search
CPC ..... H04L 67/12; H04L 12/2834; H04L 67/02; H04L 69/18; G06F 9/445; H04W 4/38;
(Continued)

(56) References Cited

U.S. PATENT DOCUMENTS 6,402,691 B1 6/2002 Peddicord et al.
9,210,534 B1 12/2015 Matthieu et al.
(Continued)

FOREIGN PATENT DOCUMENTS

WO 03043494 A1 5/2003
WO 2013086036 A1 6/2013
(Continued)

OTHER PUBLICATIONS

"LoRa Device Developers Guide; Orange Connected Objects & Partnerships", Orange in collaboration with Actility, Apr. 2016.
(Continued)

*Primary Examiner* — Liem H. Nguyen
(74) *Attorney, Agent, or Firm* — Steven J. Rocci P.C.

(57) ABSTRACT

A network node stores connection data required for remote devices to connect with it and to share content data with it. The network node shares the connection data with other network nodes that are capable of communicating with the remote device, and retrieves connection data for a remote device from another network node if the connection data is not stored in the first node. The network node also communicates with a remote server to retrieve the connection data if it is not present in one of the other network nodes. The network node securely communicates content data received from the remote devices to a remote data store.

16 Claims, 9 Drawing Sheets

Related U.S. Application Data continuation of application No. 17/494,267, filed on Oct. 5, 2021, now Pat. No. 11,641,400, which is a continuation of application No. 15/865,990, filed on Jan. 9, 2018, now Pat. No. 11,165,866.

(51) Int. Cl.

| | | |
|---|---|---|
| *H04L 12/28* | (2006.01) | |
| *H04L 67/02* | (2022.01) | |
| *H04L 69/18* | (2022.01) | |
| *H04W 4/38* | (2018.01) | |
| *H04W 4/80* | (2018.01) | |
| *H04W 12/02* | (2009.01) | |
| *H04W 28/06* | (2009.01) | |
| *H04W 84/18* | (2009.01) | |
| *H04W 88/16* | (2009.01) | |

(52) U.S. Cl.
CPC ............. *H04W 4/38* (2018.02); *H04W 4/80* (2018.02); *H04W 12/02* (2013.01); *H04W 28/06* (2013.01); *H04L 67/02* (2013.01); *H04L 69/18* (2013.01); *H04W 84/18* (2013.01); *H04W 88/16* (2013.01)

(58) Field of Classification Search
CPC ....... H04W 4/80; H04W 12/02; H04W 28/06; H04W 84/18; H04W 88/16; H04W 12/50
See application file for complete search history.

(56) References Cited

U.S. PATENT DOCUMENTS

| | | | |
|---|---|---|---|
| 9,215,075 B1 | 12/2015 | Poltorak | |
| 9,230,421 B2 | 1/2016 | Reeder et al. | |
| 9,531,704 B2 | 12/2016 | Erickson et al. | |
| 9,565,707 B2 | 2/2017 | Raleigh et al. | |
| 9,596,584 B2 | 3/2017 | Hyde et al. | |
| 9,629,193 B2 | 4/2017 | Erickson et al. | |
| 10,464,675 B1 | 11/2019 | Rabii et al. | |
| 10,547,613 B1* | 1/2020 | Roths | H04L 9/0844 |
| 10,779,162 B1* | 9/2020 | Wei | H04W 76/14 |
| 2003/0102253 A1 | 6/2003 | Liu et al. | |
| 2004/0143738 A1* | 7/2004 | Savage | G06Q 20/383 |
| | | | 713/168 |
| 2005/0055244 A1 | 3/2005 | Mullan et al. | |
| 2005/0102384 A1 | 5/2005 | Ueno et al. | |
| 2005/0244060 A1 | 11/2005 | Nagarajan et al. | |
| 2008/0218376 A1 | 9/2008 | Dicks et al. | |
| 2009/0254646 A1 | 10/2009 | Brown et al. | |
| 2009/0313057 A1* | 12/2009 | Slayton | G06Q 10/06 |
| | | | 705/1.1 |
| 2011/0264730 A1* | 10/2011 | Dattagupta | H04L 12/2809 |
| | | | 709/203 |
| 2011/0307858 A1 | 12/2011 | Biswas et al. | |
| 2012/0129513 A1 | 5/2012 | van der Laak | |
| 2012/0182939 A1* | 7/2012 | Rajan | A61B 5/002 |
| | | | 370/328 |
| 2012/0185267 A1* | 7/2012 | Kamen | A61B 5/0024 |
| | | | 705/2 |
| 2013/0102253 A1 | 4/2013 | Marsh et al. | |
| 2013/0304489 A1 | 11/2013 | Miller | |
| 2014/0195639 A1 | 7/2014 | Kamen et al. | |
| 2014/0201394 A1 | 7/2014 | Wagstaff | |
| 2015/0081763 A1 | 3/2015 | Sipola et al. | |
| 2015/0303966 A1 | 10/2015 | Lee et al. | |
| 2016/0006707 A1 | 1/2016 | Ying et al. | |
| 2016/0142894 A1 | 5/2016 | Papakonstantinou et al. | |
| 2016/0165663 A1* | 6/2016 | Shanmugam | H04W 76/12 |
| | | | 370/338 |
| 2016/0187153 A1* | 6/2016 | Johnson | G16Z 99/00 |
| | | | 701/500 |
| 2016/0344699 A1 | 11/2016 | Baldwin | |
| 2016/0366213 A1 | 12/2016 | Kazanchian et al. | |
| 2016/0371446 A1 | 12/2016 | Otin | |
| 2016/0373917 A1 | 12/2016 | Logue et al. | |
| 2017/0028178 A1 | 2/2017 | Skoda | |
| 2017/0041381 A1* | 2/2017 | Tal | H04W 12/35 |
| 2017/0041868 A1 | 2/2017 | Palin et al. | |
| 2017/0048700 A1 | 2/2017 | Huang et al. | |
| 2017/0163795 A1 | 6/2017 | Kuang | |
| 2017/0169170 A1 | 6/2017 | Otin | |
| 2017/0173262 A1 | 6/2017 | Veltz | |
| 2017/0201441 A1 | 7/2017 | Choi et al. | |
| 2017/0227965 A1 | 8/2017 | DeCenzo et al. | |
| 2017/0259072 A1 | 9/2017 | Newham et al. | |
| 2017/0272316 A1 | 9/2017 | Johnson et al. | |
| 2017/0272317 A1* | 9/2017 | Singla | H04L 41/16 |
| 2017/0295167 A1 | 10/2017 | Robinson et al. | |
| 2018/0165429 A1 | 6/2018 | Leong | |
| 2018/0167812 A1 | 6/2018 | Nagarajamoorthy et al. | |
| 2018/0247128 A1 | 8/2018 | Alvi et al. | |
| 2018/0317071 A1 | 11/2018 | Rabii et al. | |
| 2018/0321951 A1* | 11/2018 | Fitzgerald | G06F 16/3326 |
| 2018/0368197 A1* | 12/2018 | Zeilingold | G16H 40/63 |
| 2019/0046056 A1 | 2/2019 | Khachaturian et al. | |
| 2019/0108324 A1 | 4/2019 | Graube et al. | |
| 2019/0190782 A1* | 6/2019 | Panje | H04W 12/50 |
| 2019/0288860 A1* | 9/2019 | Poltorak | H04L 63/04 |
| 2019/0313907 A1 | 10/2019 | Khachaturian et al. | |
| 2019/0327161 A1 | 10/2019 | Cannell et al. | |
| 2020/0213789 A1* | 7/2020 | Doebeli | H04W 4/80 |
| 2020/0346025 A1* | 11/2020 | Golden | G16H 40/40 |
| 2021/0184924 A1 | 6/2021 | Geiger et al. | |
| 2022/0279021 A1 | 9/2022 | Raleigh | |
| 2023/0198782 A1* | 6/2023 | Poltorak | H04L 63/04 |
| | | | 713/175 |

FOREIGN PATENT DOCUMENTS

| | | |
|---|---|---|
| WO | 2016130532 A1 | 8/2016 |
| WO | 2017075496 A1 | 5/2017 |

OTHER PUBLICATIONS

"Machine-to-Machine Communications (M2M); Use Cases of M2M applications fore Health", ETSI TR 102 732 V1 .1.1 (Sep. 2013).

Miranda, Jorge, et al., "An Open Platform for Seamless Sensor Support in Healthcare for the Internet of Things", Sensors, Dec. 8, 2016.

Ngoc, Tam Vu, "Medical Applications of Wireless Networks", A survey paper written guidance of Prof. Raj Jain, Apr. 28, 2001.

Personal Connected Health Alliance, "Fundamentals of Data Exchange", Sep. 2015.

Yoon, Wondeuk, et al., "6Lo Bluetooth Low Energy for Patient-Centric Healthcare Service on the Internet of Things", Internet of Things Conference, Oct. 2014.

* cited by examiner

APPARATUS FOR SHARING NETWORK DEVICE CONNECTION DATA

RELATED APPLICATIONS

This application is a continuation of U.S. patent application Ser. No. 18/304,991, filed Apr. 21, 2023, which is a continuation of U.S. patent application Ser. No. 17/494,267, filed Oct. 5, 2021, now U.S. Pat. No. 11,641,400, which is a continuation of U.S. patent application Ser. No. 15/865,990, filed Jan. 9, 2018, now U.S. Pat. No. 11,165,866, the entirety of which is incorporated herein by reference.

FIELD OF THE INVENTION

This invention relates generally to secure communication systems and methods. In the disclosed embodiments, a secure wireless communication network comprises Bluetooth Low Energy (BLE) and other devices coupled via gateway(s) to any endpoint including but not limited to the Internet, Electronic Health Records (EHR), data management and various servers, allowing for access by services and users of the system.

BACKGROUND

Generally speaking, so called "Smart" vital signal medical devices have become ubiquitous and readily available, contained in such products as consumer smart-scales, smart blood pressure meters, smart glucose meters, and others. The data produced by such devices is useful in a number of healthcare and wellness environments. However, the wireless technology and protocols used in such readily available consumer equipment makes long range transmission difficult for a number of reasons. The claimed invention described herein offers a more robust apparatus and method for performing this task.

Typically, vitals devices are equipped with integrated Bluetooth Low Energy (BLE) radios. BLE itself, a relatively short range protocol, requires some form of a gateway device to allow long range transmission of the data to remote web services or Electronic Health Record (EHR) systems. For the most common instances, a user's smartphone is expected to fulfill this role. Further details can be found in the Bluetooth Core Specification version 4.0 and later.

One drawback of using a cellular phone for this role is that many devices require the phone to be in close proximity to the device when the measurement is taken. Additionally, a specific application related to the smart device often must be installed and configured by the user of the system. This requires multiple specific application software sets to be installed on the phone of a single user if they have multiple smart devices. Additionally, the application software may need to be performed in the foreground, meaning that the telephone requires a user's interaction prior to and during the measurement process. This entails an additional burden upon the patient and consumer of such data.

Another drawback associated with using a cellular phone is that BLE connections themselves are often unreliable on complex platforms, such as modern smartphones, which have many hidden software activities being simultaneously performed. Packets over a BLE link can be reordered or coalesced many times from connection to connection, in essence, by changing the over-the-air persona of the smartphone, further exposing transmission errors and precipitating the occurrence of reception errors that may be present in the smart device's firmware.

Another common difficulty encountered with connecting a multi-protocol gateway device communicating with a BLE device to a longer range wireless network is the timing-sensitive nature of the BLE packets. Bluetooth Low Energy (BLE) divides the 2.4 Ghz industrial, scientific and medical devices (ISM) band into 40 channels of 2 Mhz in width. Although not conforming to a linear map between frequency space and channel id number, the protocol makes an effort to spread communications over the entire width of the ISM band in order to probabilistically avoid interference from other BLE connections as well as WiFi/802.11x or any other communications system making use of the band. Attempts to create a form of a dedicated communication channel tunnel where a remote service makes requests to send and receive BLE packets may again encounter limitations in the smart devices where both elements expect events to take place in narrow intervals and cannot tolerate jitter or delay in the timing.

An additional difficulty associated with producing such a gateway is that some long-range communications technologies may have unacceptably long latencies and low bit rates. Even though some smart devices may measure quantities as simple as a person's weight, the total data volume of data that needs to be transferred can result in the tens of thousands of bytes. Reducing the requisite volume of data is a desired intention.

BLE smart devices utilize a security model that involves a "pairing" process whereby the remote device and the "host" device perform a key exchange that allows for secure communication. Some methods of key-exchanges require a user interface on the "host" device to enter a secure entry of a secret code, typically known as a "PIN". This is nearly impossible on a gateway device that contains no user interface. Even in cases where a user interface is neither available or not required, the process appears to be too complicated for many users, with many users reporting difficulty in pairing their devices. Additionally, it does not in principle, make sense that users themselves must perform the key exchange since it should be possible to distribute keys between the device and gateway prior to device distribution in order to achieve the same, or an even higher level, of security. The security function is expressed by: $E_x(y)$, which is the AES-128 standard encryption of plaintext y by key x as defined in FIPS-197.

Another limitation associated with BLE gateways is their relatively short reception range, which may not allow a single gateway to achieve ideal coverage for an entire building. The use of multiple gateways can incur significant cost because of the need to use multiple long range wireless transmitters. Additionally, smart home devices that are "paired" with one gateway, may begin to loose their connectivity function if they are moved ever so slightly to connect to a different gateway in the same building.

Yet another common problem is that it may not be necessary to limit the instances in which data can be collected from a smart device to those instances where a specific gateway is in proximity of said device since the end point for the data is actually an internet service.

SUMMARY OF THE INVENTION

In its most general aspect, the present invention includes a BLE chip-set, containing a multitude of processors, communication radios, memory for the storage of data, and software programs for controlling the communications taking place over the radios. Antennas, and appropriate electronic circuits may also be contained so as to connect the various communications components and processors. The ability to select specific software programs for loading, depending on which smart home devices the gateway should be connecting to, affords maximal selectivity in addressing remote devices.

In another aspect, a secure communication device is provided to operate in a networked multi-protocol system that may communicate with smart devices. The communication device may include a Bluetooth communication network controller, having a processor and transmitter, said network controller configured to maintain consistent over-the-air profile from the smart devices perspective and receive information from the smart devices and transmit said information from the smart devices for use by stakeholders over a communication channel.

The device gateway uses an address in a random privately resolvable space by exchanging keys over a publicly offered communication channel wherein the same address resolution key is re-used to generate an offered media access control address (MAC address) to further afford the exchange of more secure bonding keys that are transparently copied between device gateways, said key computation more specifically contained in a variation of a known sequence.

The Bluetooth controller transceiver is interoperable with a plurality of smart devices, wherein said plurality of smart devices are BLE configured medical vital signs devices.

The secure communication device further includes components selected from the group consisting of a LoRa ("Long Range", a spread spectrum modulation technique derived from chirp spread spectrum (CSS) technology) transceiver element wherein said LoRa transceiver is further operable on a separate and concurrent radio channel simultaneously with said other communication channels; a WiFi transceiver element wherein said WiFi transceiver is further operable on a separate and concurrent radio channel simultaneously with said communication channels; a cellular transceiver element wherein said cellular transceiver is further operable on a separate and concurrent radio channel simultaneously with said communication channels; an Ethernet transceiver element wherein said Ethernet transceiver is further operable on a separate and concurrent radio channel simultaneously with the communication channels; a direct IP transceiver element wherein said direct IP transceiver is further operable on a separate and concurrent radio channel simultaneously with communication channels; and combinations thereof.

The secure communication device wherein said device is a gateway and includes at least two a gateways forming a mesh network configure to maximize communications with said smart devices. The number of gateways is dependent upon the number of smart devices in use and what is necessary to allow efficient communications between the smart devices which can be vitals devices and the gateways.

The secure communication device may contain software running on the device, said software being reformatted through a series of pre and post processors to output a readily understood object format; processing said object format through a shared libraries printer to further optimize said object code for execution on a stack-oriented virtual machine (VM) architecture.

The secure communication device may contain software running on the device with an executable software image being optimized in order to reduce the bandwidth required for transport over the network by creating a more lightweight version of the binary image by containing it in a more size and load time efficient format.

The secure communication device includes specific software programs which are selectively loaded depending on which smart home devices a gateway should be interconnected to by detecting devices expected to be in range. Multiple drivers are downloaded in unique combinations specific to vitals devices known to be in range of said gateways.

The secure communication device's Bluetooth controller receives identification packets from Personal Digital Assistance devices (PDAs) 1 and wearable device's wherein the location of the PDAs and wearable devices in relation to the smart devices is correlated to determine the identity of the user of the smart device.

There are other inventive matters including systems, methods and software that are set forth more fully in the detailed description, which matters will be the subject of further claim sets.

BRIEF DESCRIPTION OF THE DRAWINGS

The accompanying drawings, illustrate exemplary embodiments of the invention, and together with all of the parts of this application, serve to explain the features of the invention.

DETAILED DESCRIPTION OF THE PREFERRED EMBODIMENT

Many smart devices are now readily available in consumer markets. For example: body weight scales, blood-pressure monitors, glucometers, thermometers, pulse oximeters and fitness trackers are a subset of the myriad of medical monitoring devices available to consumers and healthcare professionals. Manufacturers consistently focus on providing a more ideal user experience involving the user's phone and either a single medical smart vitals device or a number of medical smart vitals devices. Communication standards, so far, have been a low priority, and in many cases, manufacturers have undertaken efforts specifically aimed at limiting interoperability. From a healthcare perspective, this has limited the utility of what is clearly a preferred digital generated healthcare data format, since the smart home devices already have the capability to transmit data wirelessly. The various embodiments set forth herein create a form of wireless wide area network (WWAN) that is capable of communicating with this plethora of smart devices using an extension of the BLE standard.

As an example, an individual may own various smart home devices in their home, such as a body-weight scale or a blood pressure monitor, as well as use several more portable devices, such as a glucometer and a pulse oximeter. All of these smart home devices, while having a need to navigate a diverse set of higher level protocols, would make use of the underlying BLE protocol. Although these devices are all designed to make use of a personal area network (PAN), a preferred embodiment using a wireless system set forth herein allows them to work as though BLE is a wide area network (WAN) protocol.

Figure 1:
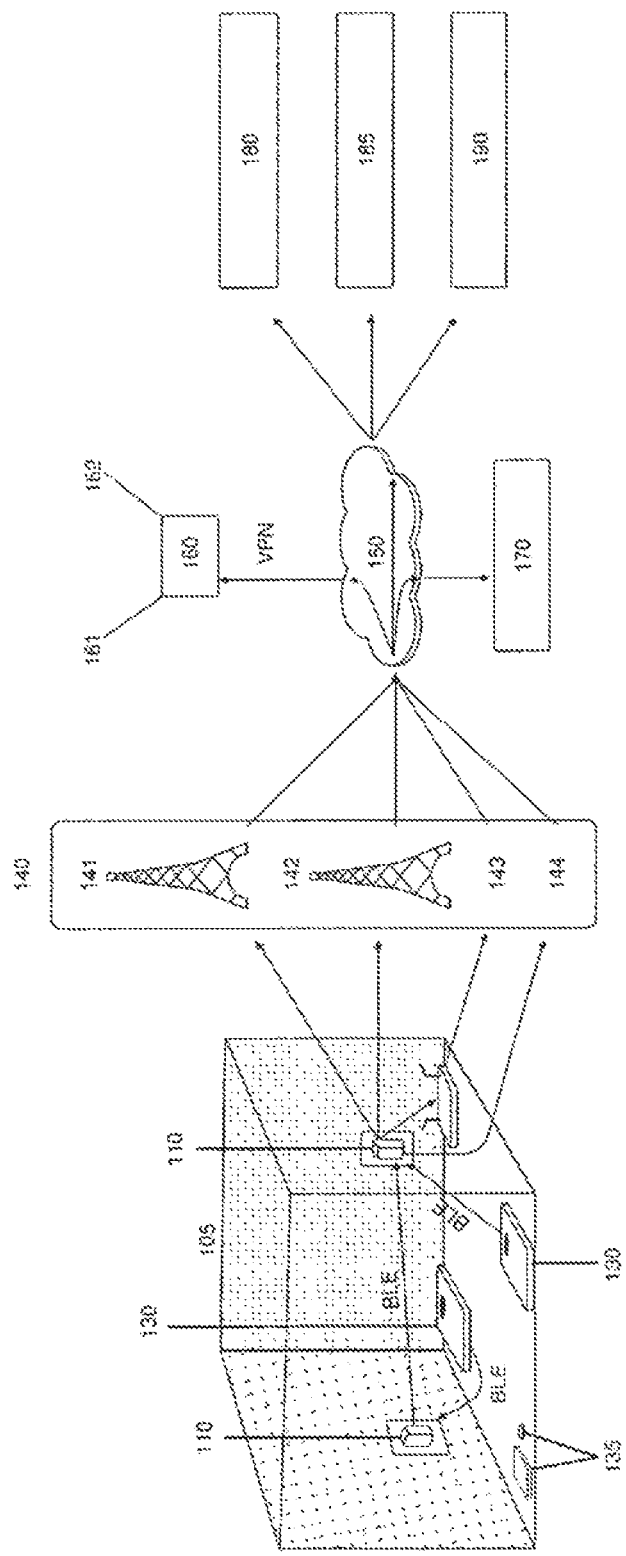
FIG. 1 illustrates the functional components of an embodiment of a wireless communication system.

By installing one or many of the device gateways 110 to communicate with a vitals device 130, the data flow system in FIG. 1 is enabled. Vitals devices 130 may be any one of the devices described above, including scales to measure weight, glucose monitors to measure blood sugar levels, blood pressure measuring devices, pulse oximeters, or other monitoring and data producing devices. The measurements generated by these vital monitoring devices 130 are "scraped-off" to reduce the necessary data transfer volume, thus enabling them to be monitored by users of the system, including patients and physicians, patient care managers and other interested parties. The process of "scraping" involves eliminating ancillary data contained in a vitals device measurement data set not essential to the transfer of core data, such as contained in the layered packet transport protocol overhead. Gateways 110 are set up to form a mesh network in order to cover the entire facility housing the vitals devices 130. A particular gateway 110 determines which vitals devices it will monitor in view of which gateway receives the strongest signal from the particular vitals device 130. These measurements may be sent by the gateways 110 via transmission means 140 over the Internet 150 for further processing, storage and dissemination. The gateways 110 that form a mesh network to cover the entire facility 105 may vary in their contained components as is necessary to most efficiently form a system that ties into transmission means 140. For example, selected gateways 110 may contain some or combinations of the radios and communication nodes used to transmit the data to Internet 150 as more fully described in the ensuing detailed description. The transmission means 140 may include transmissions via LoRaWAN referred to as "LoRa", radio networks 141, cellular radio networks 142, WiFi networks 143 and/or direct IP networks 144 that may include a cable modem or any components (not shown), such as an ethernet connection, enabling direct Internet Protocol (IP) transmissions. The transmission means that 140 may in turn distribute the vitals measurements over the Internet for further distribution. One embodiment incorporates the ability to incorporate wearable devices, mobile phones, PDAs and/or other devices, which are generally designated as devices 135. In yet a further embodiment, devices 135 may be utilized to identify the particular user or patient utilizing a vitals devices 130. Prior to a gateway device connection being formed, devices broadcast amongst themselves identifying data in an attempt to solicit incoming connections. All gateways in proximity are able to receive these identification packets and correlate the ID's with known devices. The occurrences of the witness events can then be transmitted to a web service along with the associated received signal strength indicator of said packets. The service can use this information to coarsely constrain the relative location of identified devices at various moments in time. If a vitals measurement is then taken, the relative position of all devices in the environment can be further queried for that instant. This data may be useful to ascertain the identity of the person that is using the vitals measurement device, or more specifically, used to differentiate between a small number of people that may have used the measuring device, such as the residents of a home.

Internet 150 may be used to distribute vitals information to any number of users of the system, data management services 170, or electronic health records (EHR) 160 that may in turn be transmitted or accessed by, for example, physicians 161 and/or patients 162. The vitals information or data may be distributed via Internet 150 to, for example, care management 180, patients 185, and/or personalized data services 190.

Internet 150 may also distribute such vitals information and/or data to data management services 170 capable of long term storage for both archival and analytical purposes.

Figure 7:
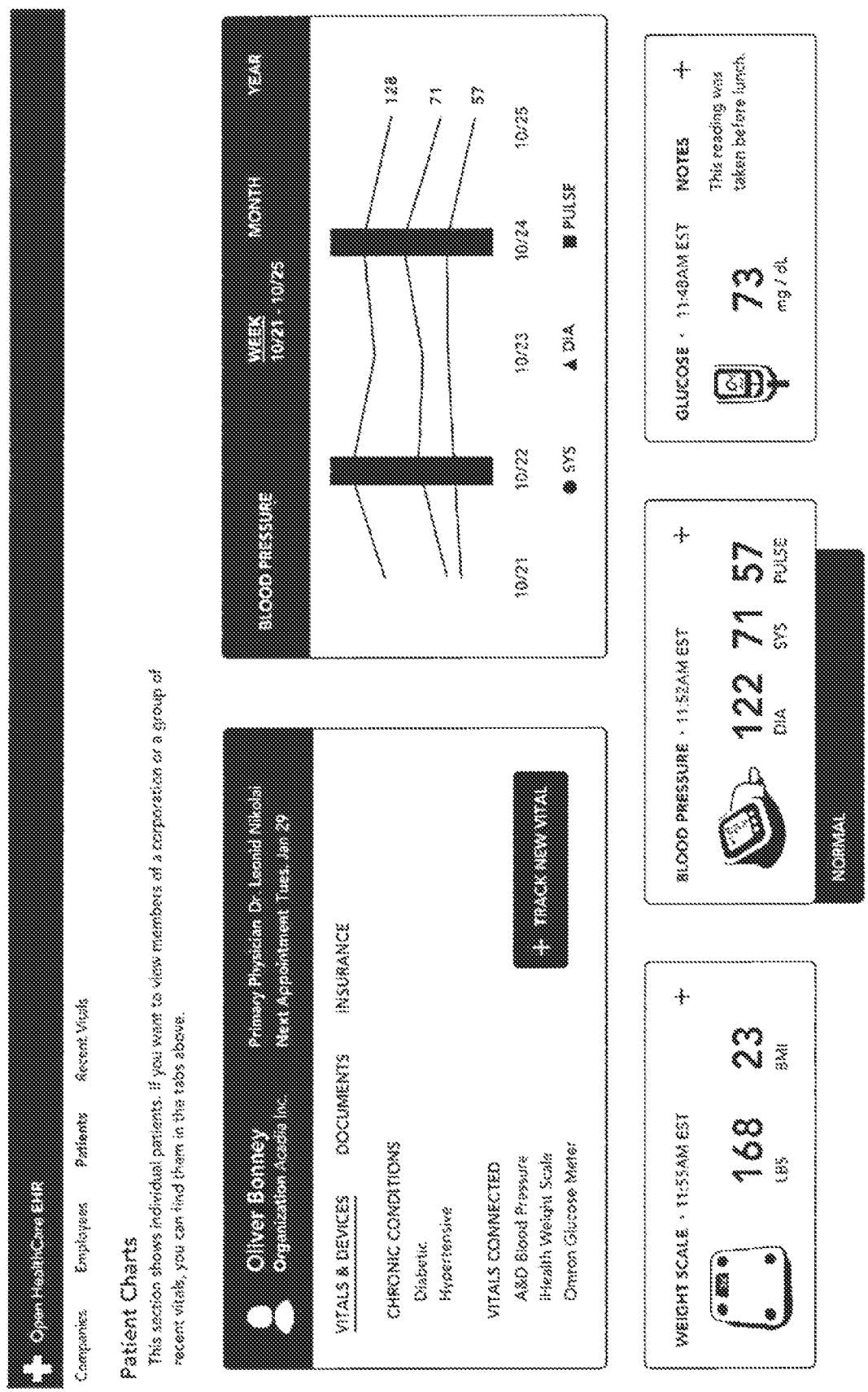
FIG. 7 illustrates a possible human interface enabled by an embodiment of the present invention.

Data may then be processed by the remote data management service 170 in such a way as to allow for direct insertion into an EHR 160. It may also be analyzed for anomalies or critical situations where manual intervention may be necessary to ensure integrity of such data and information. FIG. 7 illustrates a type of user interface that may be enabled by the present invention, with specific regard to displaying long term vitals measurement data and historical trends.

With reference to FIG. 1 and a more general wireless communication system 100, the gateway devices 110 may be installed into a mesh network in facility 105 as needed to ensure communication between the monitoring equipment such as vital devices 130 and at least one gateway device 110. The vital devices 130 are generally Bluetooth devices, more particularly BLE devices. Depending on the number and location of the vitals devices 130, gateway devices 110 can be installed and positioned in the user's facility 105 to maximize communication with vitals devices 130 to enable the secure communication of data and information to the gateway devices 110. The gateway devices 110 may be equipped with various radios and communication components necessary to ensure communication over every supported communication network described in FIG. 1.

Figure 2:
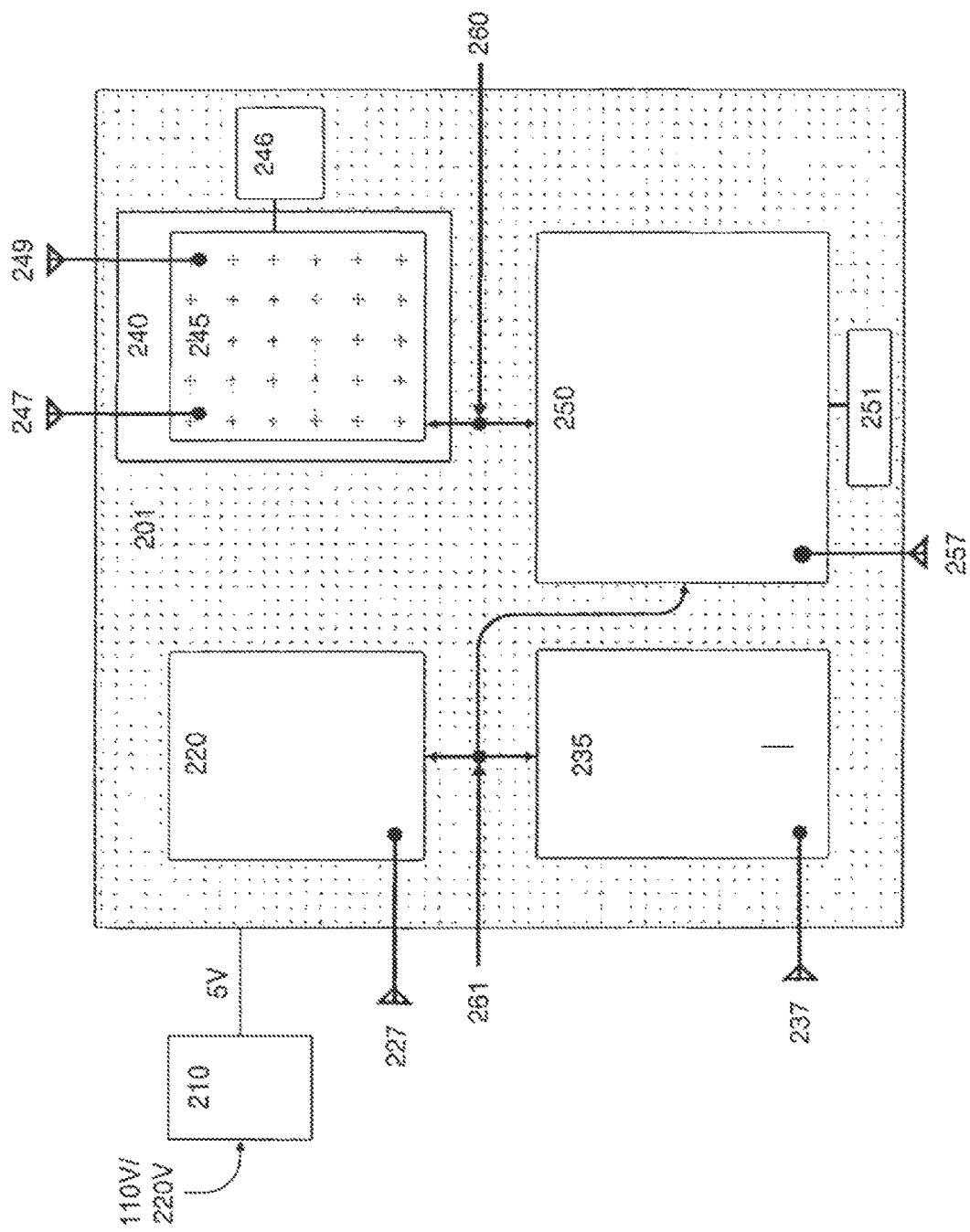
FIG. 2 illustrates the internal components of a device gateway according to a preferred embodiment of the present invention.

As seen in FIG. 2, a device gateway 110 may contain a BLE module 220 including or coupled to a real-time processor; in a preferred embodiment the BLE module 220 may be a Bluetooth radio controller. The BLE module 220 may also include a Bluetooth antenna 227, or a connection to a 2.4 Ghz antenna 227. Module 250 may be a single board computer that may contain integrated flash memory, dynamic random access memory (DRAM) and microprocessor (MPU). In a preferred embodiment, module 250 may be a more powerful single board computer and includes a WiFi transceiver with a connection to a 2.4 Ghz antenna 257. The BLE module 220 is responsible for maintaining the consistent over-the-air profile of the gateway device from the perspective of a smart home device 130. This is achieved by using low-level packet send/receive functions without making use of functions that may be capable of introducing random amounts of buffering and/or the reordering of packets. BLE module 220 also facilitates key exchanges between gateways 110 and vitals devices 130, establishing the mesh network of multiple gateways 110, scanning various vitals devices 130 to determine events such as new readings and/or measurements obtained from the vitals devices 130, enabling communication with vitals devices by supplying the correct and/or updated drivers for such devices 130, and creating secure connections to transfer such readings and measurements from devices 130 and the software running on the BLE Module 220. The BLE Module 220 can also communicate with devices that can function as a personal assistant hub including, but not limited to, devices that can run Google Home and Amazon Alexa; physical embodiments of device may be offered on Alexa, Google Home, Apple TV or third party system offering a wireless radio capability; these functions are more fully described hereinafter. All elements described in this paragraph are contained on circuit card assembly 201.

The gateway 110 may also contain a LoRa module 235 which may have a LoRa compatible transceiver and associated protocol stack running on either an included processing unit or another processor embedded into the gateway. LoRa module 235 may include a connection to a 915 MHz antenna 237. In a preferred embodiment, module 250 is programmed to control LoRa module 235 as well as to control any link between the BLE module 220 and the LoRa module 235.

The gateway 110 may contain a cellular radio 245 as well as a higher performance CPU in the form of a embedded computer 250 to manage this high bandwidth connection. This higher performance computer 250 is capable of running a standard operating system such as Linux, while simultaneously maintaining a secure channel to a remote server using a virtual private network (VPN) or other encrypted transport channel; remote updates to the software for all processors are possible over such a link. By a preferred embodiment utilizing a mini PCIE card 240 for the cellular radio 245, further in combination with computer 250, may allow for economics of scale to be achieved while providing a high performance computer 250 capable of being programmed as necessary to achieve various functionalities. In a preferred embodiment, a subscriber identity module (SIM) card 246, which is attached via a mini PCIE card 240, to enable authorized access to cellular networks. In a preferred embodiment a MicroSD 251 or Embedded MultiMediaCard (eMMC) 251 is attached to this higher performance computer 250 in order to provide bulk storage for software as well as long term logs of measurements taken and other logs useful for debugging.

A preferred embodiment for gateway 110 includes a BLE module that incorporates BLE module 220, with a LoRa radio 235, a cellular radio incorporated into PCIE card 245 that further includes both primary antenna 247 and a diversity antenna 249, and a computer module 250. The foregoing components are connected via a serial connection 261, and Universal Serial Bus (USB) 260 and may be powered by a power supply unit (PSU) 210, which may be plugged into a 110V/220V wall outlet and constructed to convert alternating current to direct current that supplies 5 volts of power to gateway unit 110 and its components. Gateway 110 may solely utilize the BLE module 220 or combinations of the above identified components and radios. Gateway 110 must provide at least one link between bluetooth and connection methods 140. Since nearby Gateways 110 may provide such a connection, a given gateway may need only contain BLE module 220, omitting the LoRa Radio 235, MPU module 250 and cellular module 245, so long as it is known that at least one gateway within the mesh can provide a service 140. Relatedly, an installed Gateway 110 meant to provide a service 140, may need only contain BLE module 220 along with LoRa module 235, if LoRa is the chosen transport. MPU module 250 can be included to give WiFi support, along with a cellular module 245 for cellular access.

Figure 3:
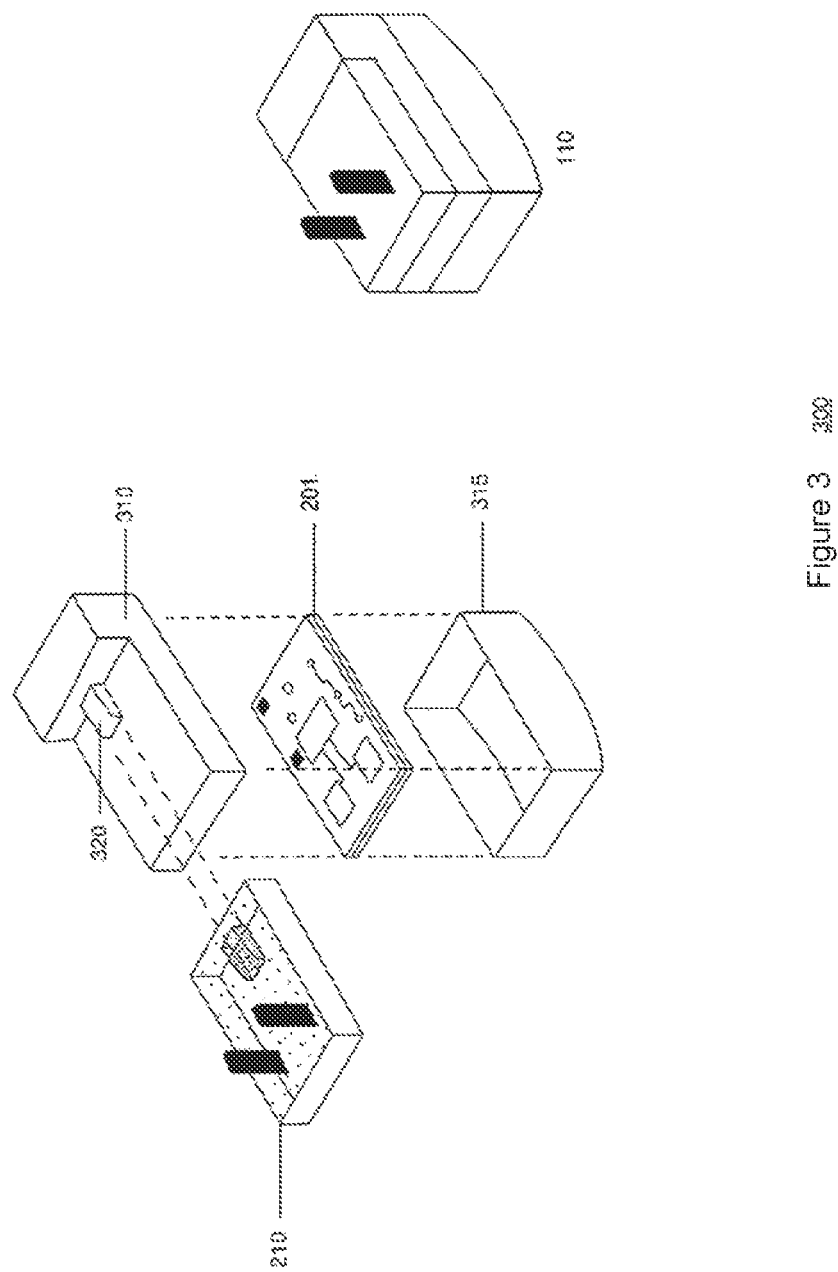
FIG. 3 illustrates a perspective view of a wireless gateway device according to an embodiment of the present invention.

With reference to FIG. 3, an embodiment is shown regarding the structure of gateway 110, showing that PSU 210 slidably and removably engages into slot connectors to make electrical contact with gateway connector contacts, preferably using a standard USB connector 320 permanently affixed to mating assembly 310. This design enables the replacement of PSU 210 should it fail or should different requirements be demanded by the components and/or radios of gateway 110. PSU 210 may be purchased or designed to be in accordance with various electrical and safety codes as well as serve as a power limiting device to ensure the safety of other components within gateway 110. Housing 315 is used to enclose the sensitive electronics from the environment.

Figure 8:
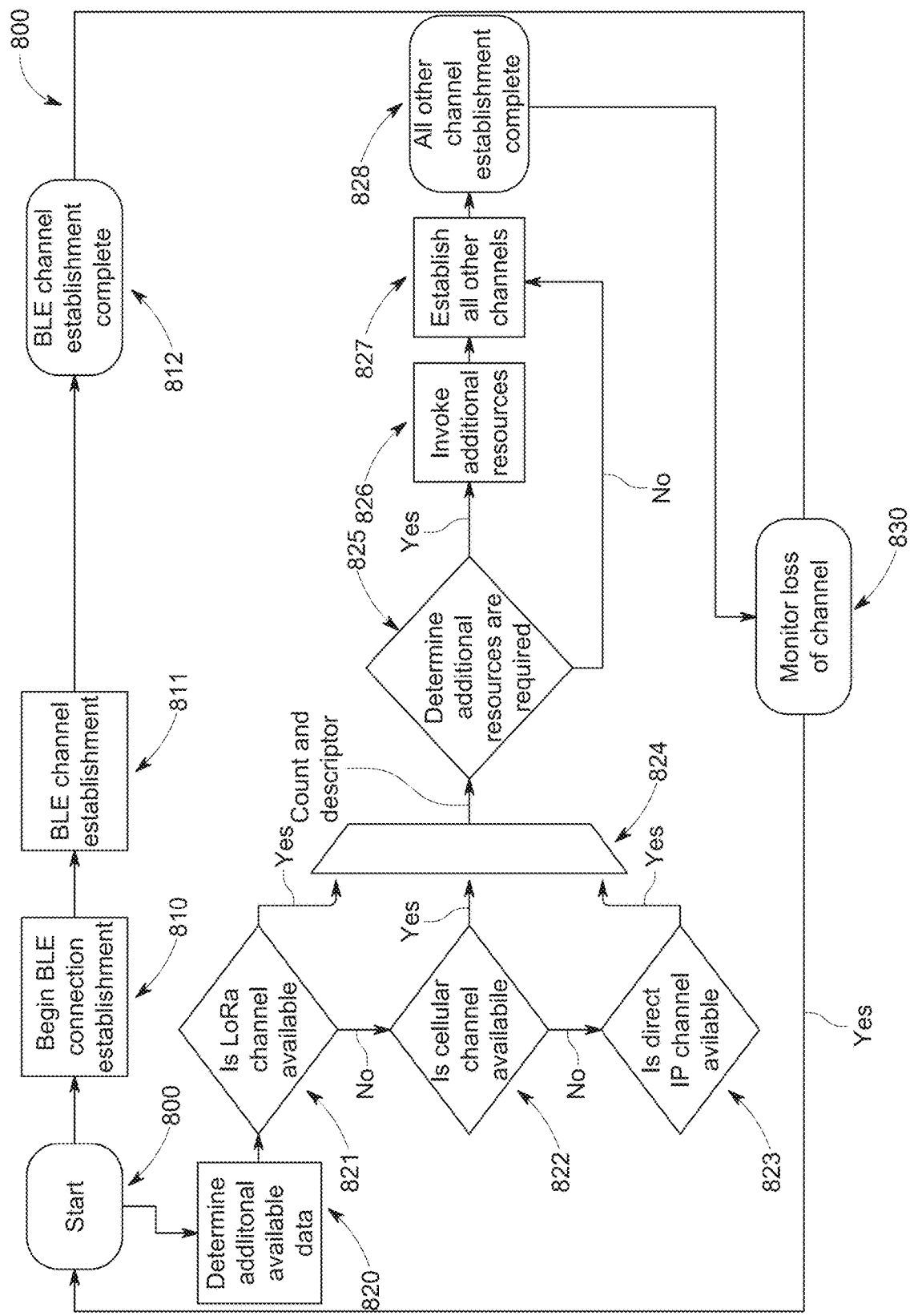
FIG. 8 illustrates the initialization process flow at start-up.

FIG. 8 illustrates the initialization process that occurs within a gateway 110 when a gateway is first powered-on. The process begins with the introduction of power as shown in FIG. 8 as the initialization element labelled "Start" 800. Once all the power-on ramps-up and the down-converting power sequencing has completed the gateway proceeds to identify and establish all available communication channels. The gateway's processor first establishes a communication path using the Bluetooth channel per 810 and 811 resulting in 812. The gateway systematically queries all other available communication pathways by checking for the availability of a LoRa, a WiFi, a cellular, and a direct channel using direct IP connectivity. The gateway determines the availability of all potentially available pathways 820 using the logical inferences contained in 821, 822, 823 and 824. Based on this query stage, 824, may invoke additional computational resources as determined by 825 by invoking 826 as needed. Once all the additional channels are established using 827, the gateway enters a quiescent mode following 828 wherein the gateway 110 monitors all identified channels for maintaining connectivity on every possible communication path using 830. In the event that a channel has been detected as not available to the system monitoring subsystem 830 begins the process of re-identifying and re-establishing available paths by reverting to stage 800. The gateway hardware is typically pre-built to contain sufficient resources to contain the processing power necessary to maintain a maximal multi-protocol communication system.

At system initialization time, the gateway 110 performs a process of identifying all possible available communication channels; this flow is illustrated in FIG. 8. This process entails establishing a BLE channel first, and from there seeking any and all possible additional offered communication channels, be they offered via LoRa, WiFi, cellular, or Ethernet or other protocols allowing connectivity such as direct IP connectivity. In the event that multiple channels are available the gateway will make a determination if more computational devices are required to best match with the requisite requirements. Resources may be predetermined at build time to minimize customer concerns.

Figure 4:
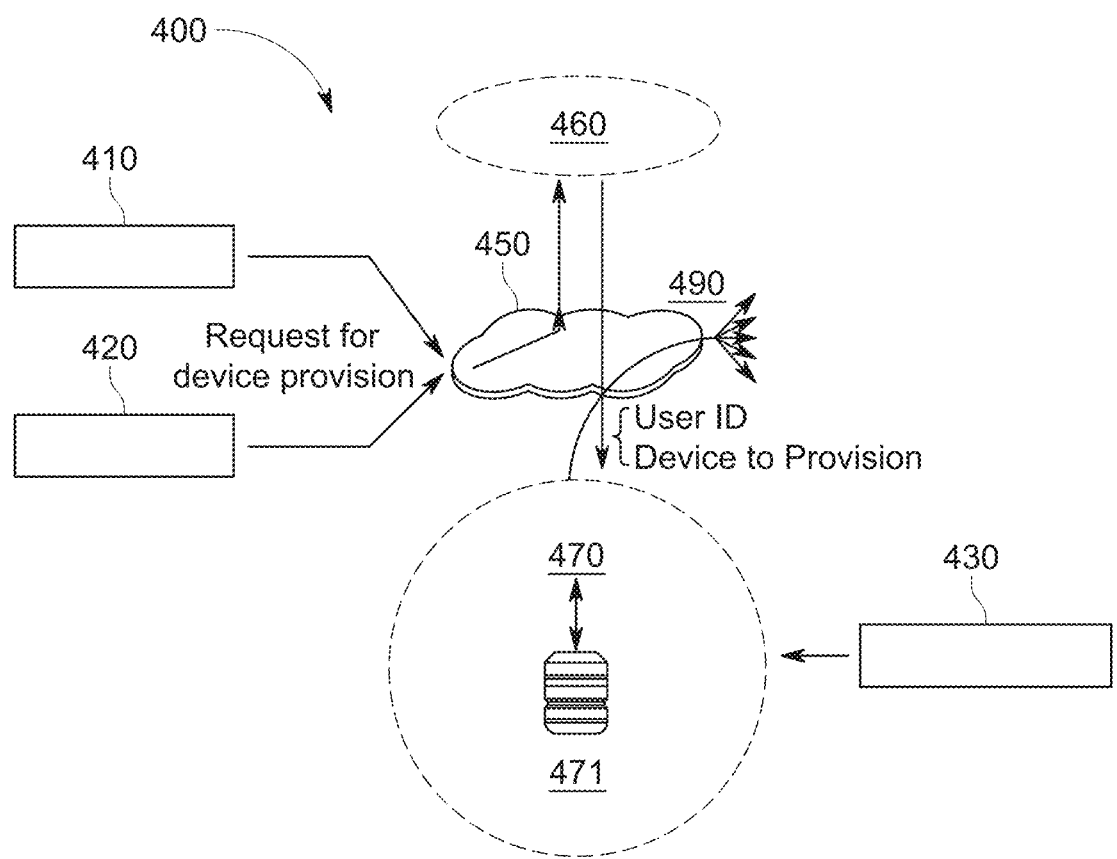
FIG. 4 is a block diagram illustrating the flows of data during management operations according to an embodiment of the present invention.

The three affordances of the implementation of security in BLE devices are: authentication, confidentiality and authorization. Many BLE slave devices may refuse to transmit vitals data if the link encryption protocol is not enabled. Additionally, most devices require some sort of mechanical user input, such as pushing a specific button in order to enable encryption with a new peer. FIG. 4, describes a showing how the keys generated/exchanged during the bonding process may be sent to the management services ("MS") 470 in encrypted form using a secret key known only by gateway 110 and MS 470. If, at a later time, a different gateway 110 in environment 105 makes a connection to vitals device 130 for which it does not know the bonding keys in use, gateway 110 may then request a copy of the keys from MS 470, by using the shared secret known only to the particular instance of gateway 110.

With reference to FIG. 4, either a user 410 or their health care provider 420 may elect to provision a new vitals device 130. During this process, a request to provision the device is made via inputting information including, for example, the User ID and the identification of the vitals device over internet 450 in communication with management services ("MS") 470. MS 470 may access information from, for example, a database server 471; this database may be updated from time to time and, for example, when a new device is provisioned, the software for which then attempts to transfer the new data to the relevant gateways on a best efforts basis, via links to gateways 490—these provisioning packets contain the driver code and device keys, if relevant, to "scrape" the configured target vitals device for storage and use by network 100. Alternatively, MS 470 may access information from a cloud service 430 or otherwise. This request can be initiated by any software or website 460 with sufficient privileges to make the request. Website 460 is home to an EHR database and may be the front end that monitors the vitals or enables initiating provisioning for a new vitals device as is more fully described hereinafter and shown in FIG. 7. The database (DB) 471 may contain the MAC addresses for the vitals devices 130 and gateways 110, relevant links and code to extract vitals data. DB 471 may also contain a unique encrypted patient ID, where the vitals devices 130 and gateways 110 are housed together with owners of these devices and case managers for these devices. DB 471 may additional contain physician or other interested user information and link this information to the users of the vitals devices.

Once the provisioning request is extended, an attempt is made to locate the corresponding gateways in proximity to the specific user, then the provision is stored in the database. Upon location of corresponding gateways 110, MS 470 forwards the requisite information to the correct gateway via links 490.

The real-time processor associated with the BLE module 220 is responsible for executing smart device specific drivers during every connection. These drivers may be distributed in a binary device-agnostic form and in a preferred embodiment, a reformatted variant of the WebAssembly binary format. These drivers are relatively small and can be transferred even over low-bandwidth links such as LoRa. Multiple drivers can be simultaneously loaded on BLE module 220 of gateway 110 in unique combinations specific to the gateway 110, in particular by making use of knowledge of which devices 130, 135 are expected to be in range.

Figure 6:
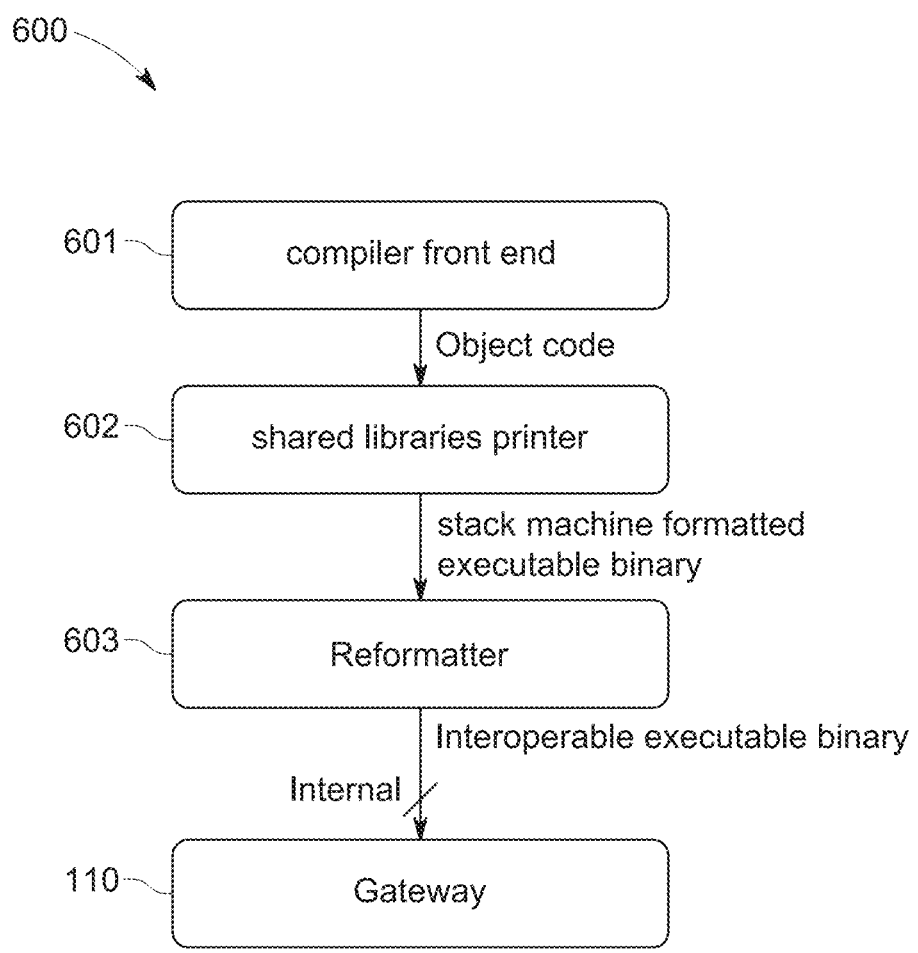
FIG. 6 is a block diagram illustrating the process of converting commonly well-understood human readable code to a machine executable code in accordance with a proscribed embodiment of the present invention.

FIG. 6 illustrates how the software that executes on the gateway 110 is first reformatted by a series of pre and post processors. The source code is first run through a compiler 601 to output a readily understood object format. The object code is then processed by a shared libraries printer 602 that optimizes the object code for execution on a stack-oriented virtual machine (VM) architecture. In order to reduce the bandwidth required for transport over certain networks, the reformatter 603 optimizes the executable image into a more, size and load time, efficient format; this format is interoperable among the supported devices.

Figure 5:
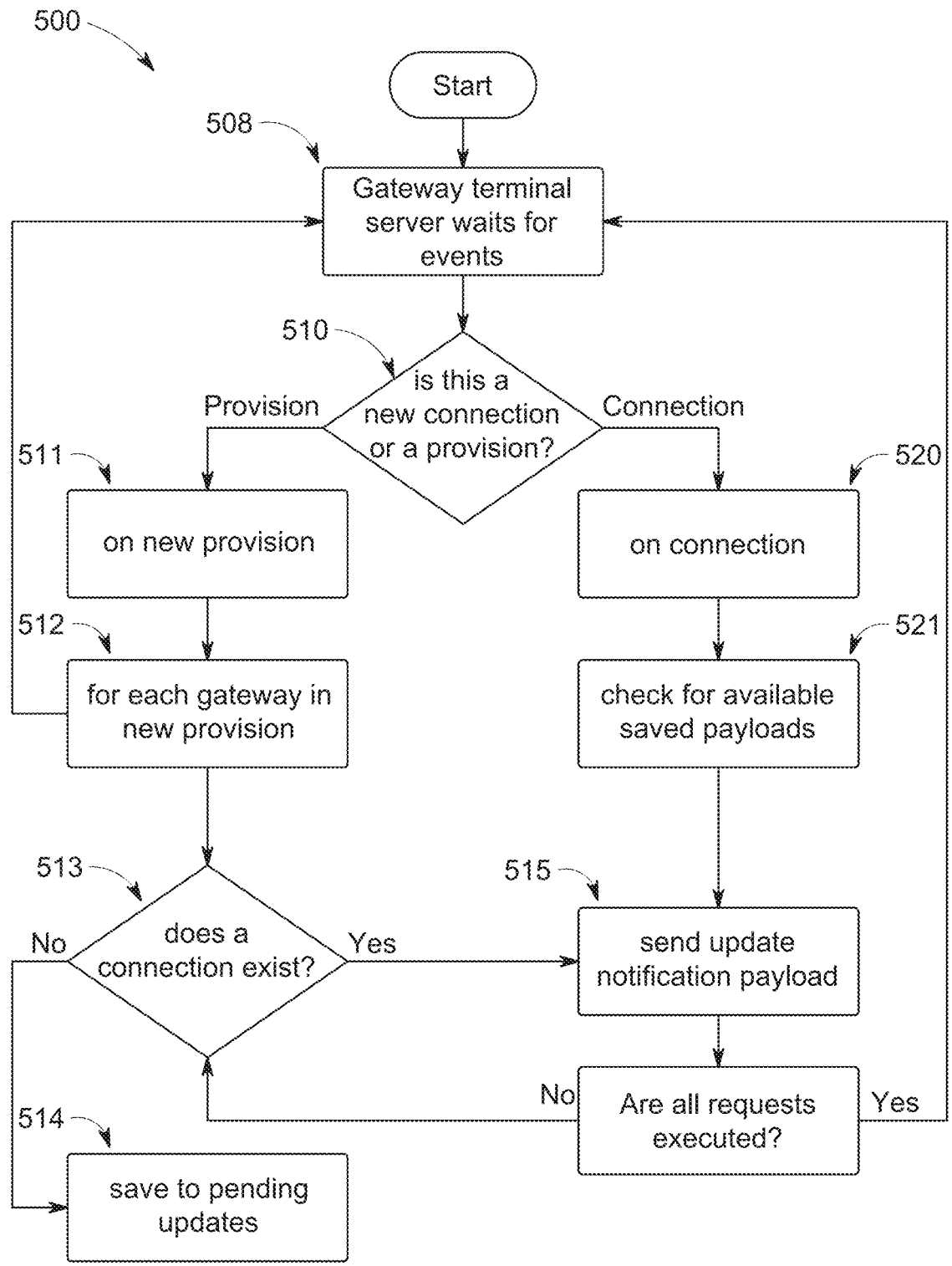
FIG. 5 is a block diagram illustrating the event listening state machine according to an embodiment of the present invention.

FIG. 5 illustrates the steps used in the gateway's connection and provisioning process. Element 509 shows the first step wherein the gateway terminal server waits for events, when an event is detected element 510 determines if the recognized event corresponds to a provisioning request or to a connection request. Element 511 determines if the event is associated with a new provisioning request passing this information to element 512 which determines for how many gateways a provisioning requests is required; for each gateway in a new provisioning request the flow returns back to element 509 where the previously described flow continues until all provisioning requests first detected are exhausted. Once element 513 is completed, it will determine if a connection already exists, if not, then element 514 saves the provisioning request(s) to a queue of pending updates; if determined that an positive affirmation response such as a "yes", is expected, then element 515 sends an update notification payload to the requesting gateway and then returns to element 513 until all request are exhausted after which the procedure returns to element 509 to await receipt of new events. In the case that element 510 had determined that a connection request was detected element 520 will confirm that the connection request is valid and element 521 will check for pending payload packets to be sent by invoking element 515 until the entire series of requests are transmitted to the requesting gateway. Upon completion the process returns to element 509 to await new provisioning and connection requests.

Below is the description of the events that occur in a typical Bluetooth Low-Energy connection flow. Further details can be found in the Bluetooth Core Specification version 4.0 and later. Specific details of the physical layer such as modulation, whitening and the various polynomials used are omitted for brevity. The specific meaning of bits, the frequencies used and the timing of the events in the channel is also left to the reader. Special attention must be paid to the padding of fields during concatenation of the cryptographic primitives. All messages can lead to a variety of error notification and subsequent handling conditions, none of which are covered here.

Figure 9:
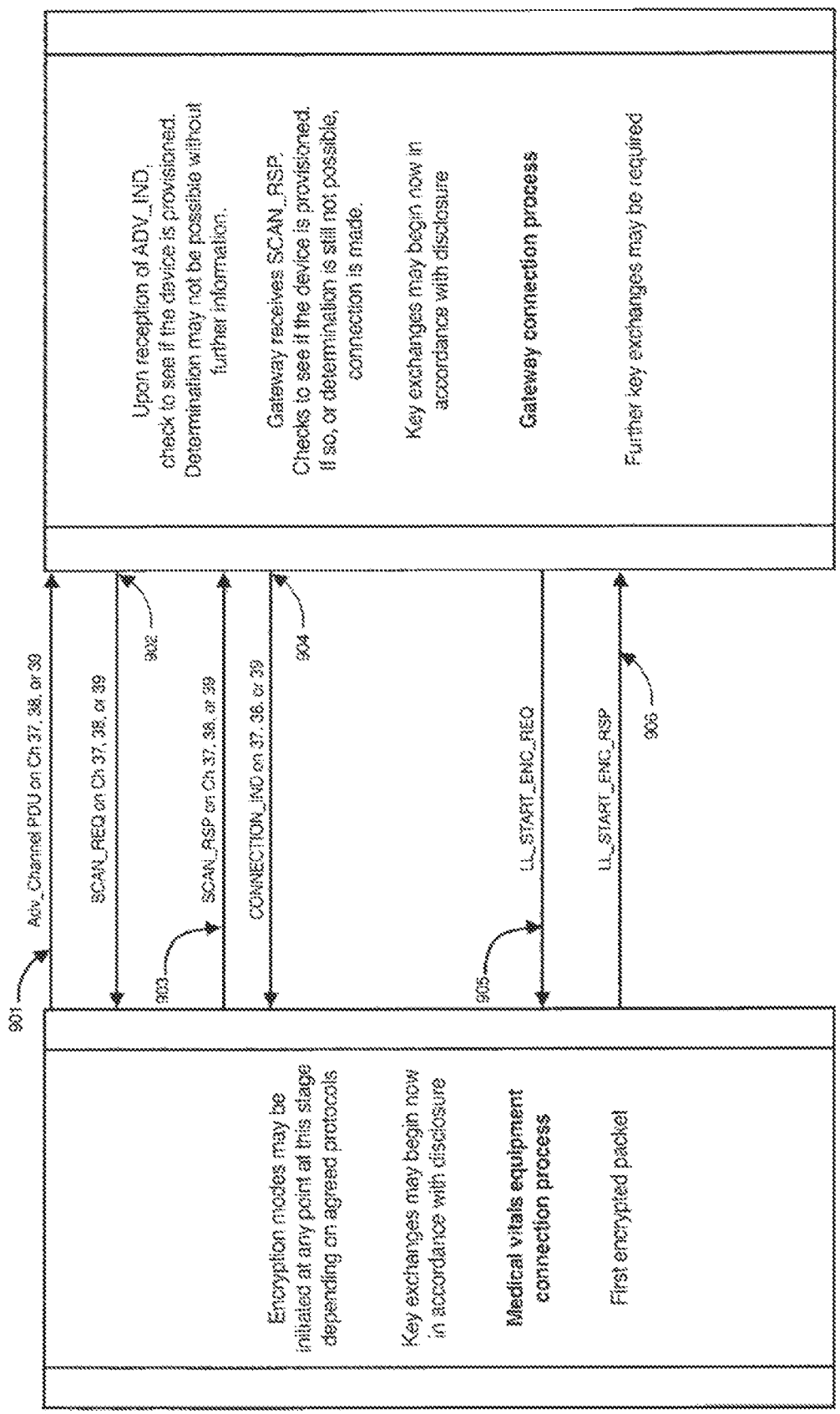
FIG. 9 illustrates the salient highlights of the protocol exchange that takes place in establishing a connection with a newly discovered BLE device being introduced and incorporated into a secure connection BLE environment.

FIG. 9 showcases the events comprising the typical connection between a bluetooth low-energy vitals device 910 and a master device such as a gateway 920. The vitals device initially advertises by sending a Adv Channel PDU message 901 on logical channel 37, 38 or 39. Once the gateway receives an ADV_IND message, it checks to see if the vitals device is provisioned. If additional information is needed to determine provisioning, the gateway 920 sends a SCAN_REQ message 902 to which the vitals device 910 responds by sending SCAN_RSP message 903. If the gateway 920 acknowledges this as a valid request, it will respond with a CONNECTION_IND response message. At this point, a new Access Address is randomly generated by the gateway 920. Access Address is a connection unique identifier generated according to specified rules.

The MAC address is used for the identification of peers while establishing and securing the link. A mapping between device MAC address and a randomly generated Access Address is created when a connection is initiated. The features of the security extensions offered in the claimed invention improve limitations contained in the standard BLE security protocol. Since the BLE protocol exposes the MAC addresses of both the master and slave during a connection process, provisions to the protocol were made in which devices could remain anonymous. This is implemented by creating MAC addresses, which are periodically updated.

The device gateway 110 makes use of an address in the random private resolvable space in the BLE specification. This is used in bonded devices and requires the Identity Resolving Key (IRK) to be shared during Phase Three of the pairing procedure as defined in the Bluetooth Core Specification version 4.1. In usual practice, such addresses are made to change periodically based on a timer or other method whereas, in the present invention, such addresses may remain static. Each gateway 110 in environment 105, uses a different such address, all generated from this same IRK, where IRK is any suitable 128-bit key material. This allows the bonding keys to be transparently copied between trusted device gateways 110. This implies there exists a multitude of MAC addresses that a peer will associate with correct link keys. The resulting scheme easily allows inter-gateway connections to be created for the purpose of creating a mesh network.

What is claimed is:

1. A network node adapted to receive content data from devices that are remote from the network node and that are capable of providing an indication that they are available to connect to the network node, the network node defining a first node and comprising:
  a. a memory for storing connection data that facilitates connections of the remote devices to the first node, wherein the presence of connection data corresponding to a particular remote device in the first node is required for the particular remote device to communicate content data to the first node;
  b. a transceiver adapted to: (i) securely transmit at least portions of stored connection data for receipt and storage by a second node; (ii) securely receive at least portions of other connection data stored in a memory of the second node; (iii) securely communicate with a remote source of connection data; and, (iv) securely transmit content data received by the first node to a remote data store; and,
  c. a controller comprising processing circuitry and program code for:
  (i) determining whether the first node has stored therein connection data corresponding to a remote device, defining a new remote device, that has not formerly been connected to the first node so as allow communication of content data from the new remote device to the first node; and,
  (ii) if the connection data corresponding to the new remote device is not stored in the first node and is not available from the second node, obtaining the connection data corresponding to the new remote device from the remote source, and connecting the new remote device to the first node so as to allow communication of content data from the new remote device to the first node.

2. The network node according to claim 1 wherein the program code further comprises code for establishing a secure communications channel between the first node and a remote device connected thereto via an encryption key for securely communicating content data from the remote device to the first node.

3. The network node according to claim 1 wherein the program code further comprises code for securely storing in the memory a bonding key for each remote device connected to the first node and securely sharing the bonding key stored in the first node with the second node.

4. The network node according to claim 3 wherein the first node is a trusted node and the program code further comprises code for configuring the first node as a node in a mesh network of a plurality of trusted nodes such that the first node and at least one of the other trusted nodes may form a mesh network, wherein the first node and at least one of the other trusted nodes are capable of communicating data, including bonding keys, with each other via secure communications.

5. The network node according to claim 4 further comprising program code for configuring the first node to have a same identity as the other trusted nodes from the perspective of each remote device.

6. The network node according to claim 3 wherein the remote devices do not store connection data or bonding keys.

7. The network node according to claim 1 wherein the transceiver is a wireless transceiver capable of transmitting and receiving connection data and content data wirelessly over a wide area network (WAN) via one or more of multiple communication protocols, including one or more of LoRa, WiFi, cellular, ethernet, or direct IP protocol.

8. The network node of claim 1 wherein the program code comprises code for configuring the first node so as to maintain a consistent over the air profile with respect to the second node from the perspective of each remote device.

9. The network node according to claim 1 wherein the program code comprises code for configuring the first node to have a same identity as the second node from the perspective of each remote device.

10. The network node according to claim 1 wherein the first node lacks a hardware user input for connecting remote devices.

11. A network node adapted to receive content data from devices that are remote from the network node and that are capable of providing an indication that they are available to connect to the network node, the network node defining a first node and comprising:
  a. a memory for storing connection data that facilitates connections of the remote devices to the first node, wherein the presence of connection data corresponding to a particular remote device in the first node is required for the particular remote device to communicate content data to the first node;
  b. a transceiver adapted to: (i) securely transmit at least portions of stored connection data for receipt and storage by a second node; (ii) securely receive at least portions of other connection data stored in a memory of the second node; (iii) securely communicate with a remote source of connection data; and, (iv) securely transmit content data received by the first node to a remote data store; and,
  c. a controller comprising processing circuitry and program code for:
  (i) determining whether the first node has stored therein connection data corresponding to a remote device, defining a new remote device, that has not formerly been connected to the first node so as allow communication of content data from the new remote device to the first node;
  (ii) if the connection data corresponding to the new remote device is not stored in the first node and is not available from the second node, obtaining the connection data corresponding to the new remote device from the remote source, and connecting the new remote device to the first node so as to allow communication of content data from the new remote device to the first node;
  (iii) establishing a secure communications channel between the first node and a remote device connected thereto via an encryption key for securely communicating content data from the remote device to the first node;
  (iv) securely storing in the memory a bonding key for each remote device connected to the first node and securely sharing the bonding key stored in the first node with the second node; and, (v) configuring the first node as a node in a mesh network such that the first and second nodes are capable of communicating data, including bonding keys, with each other via secure communications.

12. The network node according to claim 11 wherein the transceiver is a wireless transceiver capable of transmitting and receiving connection data and content data wirelessly over a wide area network (WAN) via one or more of multiple communication protocols, including one or more of LoRa, WiFi, cellular, ethernet, or direct IP protocol.

13. The network node according to claim 11 wherein the program code comprises code for configuring the first node so as to maintain a consistent over the air profile with respect to the second node from the perspective of each remote device.

14. The network node according to claim 11 wherein the program code comprises code for configuring the first node to have a same identity as the second node from the perspective of each remote device.

15. The network node according to claim 1 wherein the first node lacks a hardware user input for connecting remote devices.

16. A network node adapted to receive content data from devices that are remote from the network node and that are capable of providing an indication that they are available to connect to the network node, the network node defining a first node and comprising:

a. a memory for storing connection data that facilitates connections of the remote devices to the first node, wherein the presence of connection data corresponding to a particular remote device in the first node is required for the particular remote device to communicate content data to the first node;

b. a wireless transceiver capable of transmitting and receiving connection data and content data wirelessly over a wide area network (WAN) via one or more of multiple communication protocols, including one or more of LoRa, WiFi, cellular, ethernet, or direct IP protocol and adapted to: (i) securely transmit at least portions of stored connection data for receipt and storage by a second node; (ii) securely receive at least portions of other connection data stored in a memory of the second node; (iii) securely communicate with a remote source of connection data; and, (iv) securely transmit content data received by the first node to a remote data store; and, c. a controller comprising processing circuitry and program code for:

(i) determining whether the first node has stored therein connection data corresponding to a remote device, defining a new remote device, that has not formerly been connected to the first node so as allow communication of content data from the new remote device to the first node;

(ii) if the connection data corresponding to the new remote device is not stored in the first node and is not available from the second node, obtaining the connection data corresponding to the new remote device from the remote source, and connecting the new remote device to the first node so as to allow communication of content data from the new remote device to the first node;

(iii) establishing a secure communications channel between the first node and a remote device connected thereto via an encryption key for securely communicating content data from the remote device to the first node;

(iv) securely storing in the memory a bonding key for each remote device connected to the first node and securely sharing the bonding key stored in the first node with the second node;

(v) configuring the first node as a node in a mesh network such that the first and second nodes are capable of communicating data, including bonding keys, with each other via secure communications;

(vi) configuring the first node so as to maintain a consistent over the air profile with respect to the second node from the perspective of each remote device; and, (vii) configuring the first node to have a same identity as the second node from the perspective of the remote devices;

wherein the first node lacks a hardware user input for connecting remote devices.

* * * * *